Sept. 21, 1926.　　　L. P. DELSASSO ET AL　　　1,600,402

GROUND DETECTOR

Filed Nov. 21, 1921　　　2 Sheets-Sheet 1

Inventors:
Leo P. Delsasso,
Benjamin F. Dengler,
Edwin R. Stauffacher,
By
Their Attorneys Sept. 21, 1926. 1,600,402
L. P. DELSASSO ET AL
GROUND DETECTOR
Filed Nov. 21, 1921 2 Sheets-Sheet 2
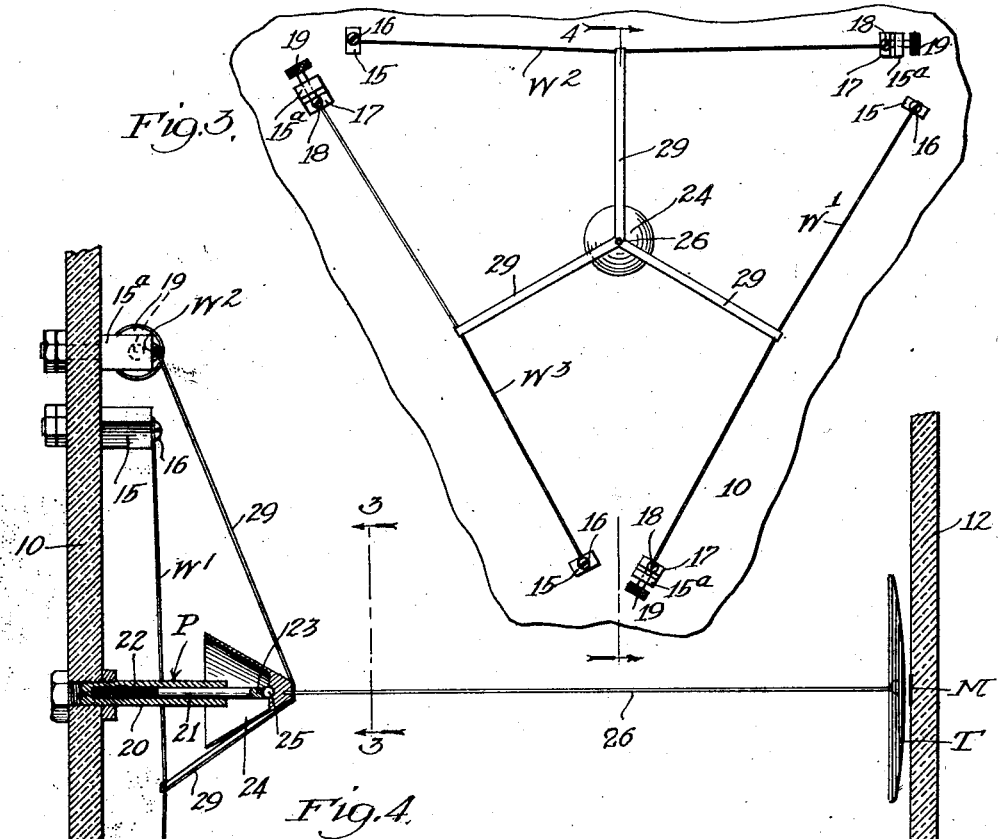
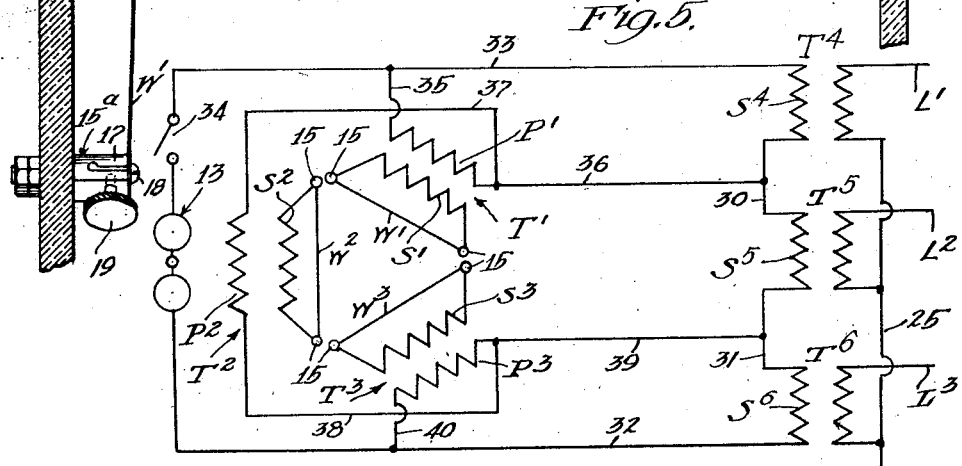
Inventors.
Leo P. Delsasso,
Benjamin F. Dengler,
Edwin R. Stauffacher,
their Attorney Patented Sept. 21, 1926.

1,600,402

UNITED STATES PATENT OFFICE.

LEO P. DELSASSO, BENJAMIN F. DENGLER, AND EDWIN R. STAUFFACHER, OF LOS ANGELES, CALIFORNIA, ASSIGNORS TO SOUTHERN CALIFORNIA EDISON COMPANY, A CORPORATION OF CALIFORNIA.

GROUND DETECTOR.

Application filed November 21, 1921. Serial No. 516,632.

This invention relates to a means of detecting accidental grounds on electric transmission and distribution circuits, particularly three phase transmission and distribution lines. The specific form of the invention herein described is applied to a three wire three-phase circuit; but it will be readily understood that the detector is not at all necessarily limited to such a circuit, and from the following description it will be easily apparent to those skilled in the art how the detector may be applied to other systems.

The detector herein described utilizes the unbalanced voltage to ground produced when one or more of the transmission or distribution line wires becomes partially or totally grounded, and is so constructed that the attendants at a station are immediately notified upon the occurrence of an accidental ground by the ringing of a bell, and of the phase and character of said ground by means of a visual indicator. From these indications it can be ascertained what circuit, phase, and wire is affected, thus greatly facilitating the clearing of the accidental grounds.

In large and complicated transmission and distribution circuits a ground may occur on a transmission or distribution line, and be very difficult of quick location unless some sort of detector is used. Such transmission and distribution lines are usually of a voltage high enough to cause considerable damage to property or life. The immediate detection of such a ground makes it possible to open immediately the station switch of that particular line, and greatly facilitates the quick location of the ground and repair of the line. Thus, such a detector is of very great value to power and lighting companies, particularly where the transmission and distribution systems are large and complicated.

In order to give a complete understanding of the invention it will be best first to give a specific description of the now preferred form of detector that embodies the invention. From this description the invention, as a whole, will be readily understood by those skilled in the art, and the objects and corresponding accomplishments of the invention will be best understood in this manner. For the purpose of so describing a specific and preferred form of the invention, we now refer particularly to the accompanying drawings in which—

Fig. 3 is an enlarged fragmentary section taken as indicated by line 3—3 on Fig. 4;

Fig. 4 is a further enlarged detail section taken as indicated by line 4—4 of Fig. 3; and Fig. 5 is a diagram illustrating the electrical connections of the detector.

Figure 1:
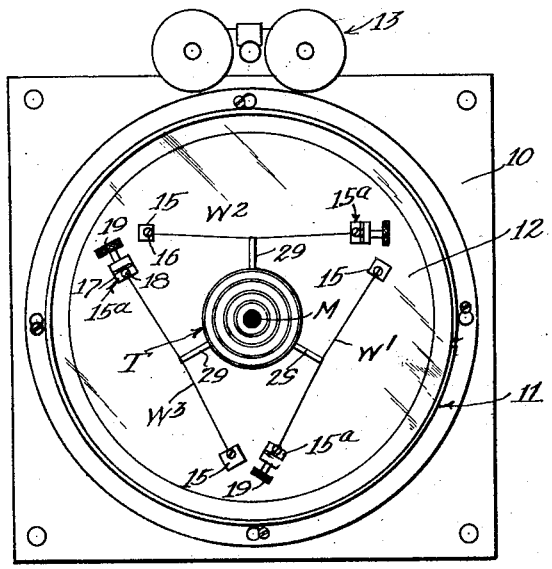
Fig. 1 is a front face view of the detector.
Figure 2:
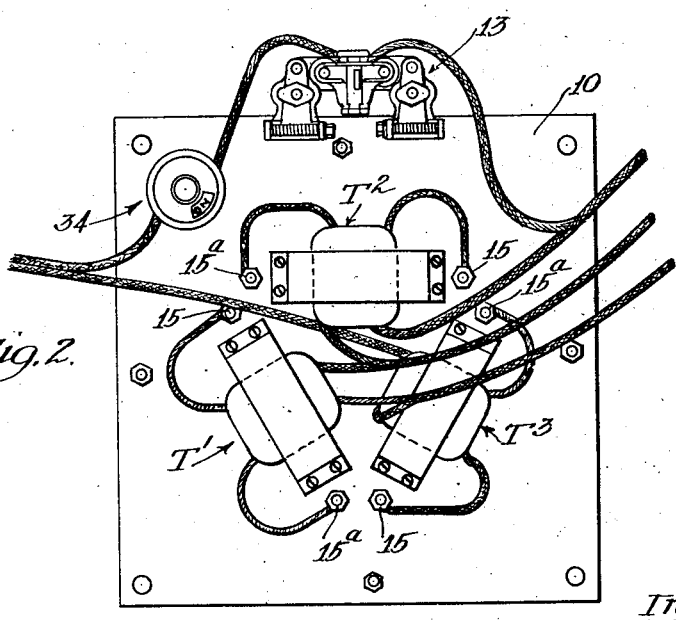
Fig. 2 is a rear face view of the same.

As will be readily understood, when the general nature of the invention is fully understood from this description, the mechanical make-up of the detector mechanism may be varied a great deal; and the mechanical arrangement that we herein describe is only a simple and convenient preferred arrangement. It is made so as to be convenient to mount on a switch board and for this purpose the detector may be mounted on a suitable base 10 of insulating material. The base 10 may carry a circular housing 11 with a glass face 12 that encloses the indicator parts of the detector. Mounted on the upper edge of the base is a harmonic bell 13 of standard construction and design. On the back of base 10 three small transformers are mounted, $T^1$, $T^2$, $T^3$, the low voltage side of each being closed through one of three resistance wires $W^1$, $W^2$, and $W^3$, arranged in triangular formation, as is clearly shown in the drawings Fig. 1. These wires are of a suitable material and of suitable size to be slightly heated by the current which normally flows through them from the transformer secondary; and are selected, as to their resistance, length and co-efficient of expansion, so that their variation in temperature, in accordance with the variation of the amount of current flowing through them, will cause a substantial change in length of the wires. The wires are rigidly connected to the posts 15 by suitable screws 16; and are connected to the posts $15^a$, by being connected by screws 18 to split portions 17 of the posts $15^a$. Adjustment screws 19 are set in the posts $15^a$ and bear against the split portions 17. These split portions are pushed forward by the adjustment screws 19 and the wires connected at 18, and then by retracting the adjustment screws the wires may be put under proper tension. The wires are all put under equal tension, or under tension as equal as may be, either while the wires are all cold, or while they are at even temperature when the whole system is in normal working condition.

There is a central supporting post P that comprises a socket 20, and a plunger 21 in the socket, a coil spring 22 serving to elevate the plunger. The plunger has its upper end cupped as illustrated at 23; a hollow cone 24 has a pivot 25 on its interior near its apex which pivot seats in the cup at 23. This hollow cone carries an indicator arm in the form of an extending wire or rod 26 with a target T at its outer end; the target T preferably having a spherical surface centering on the center at 25. This target T comes close to the back face of the glass 12; and the glass has on its back face a circular registration mark or disk M with which the target is normally centralized. For convenience of observation the target may be provided with rings, as illustrated in the drawing.

The target rod 26 is connected with the three wires $W^1$, $W^2$, and $W^3$ by suitable straps 29 which each connect to the center of a wire W and connect to the apex of the cone 24 at a short distance from the pivotal center 25. These connecting straps 29 may very conveniently be made of thin steel. When the apparatus is adjusted to normal position the wires $W^1$, $W^2$, and $W^3$ are adjusted to such equalized tension as to hold the target T in a central position and the length of the straps is such that, when the wires are adjusted under a sufficient tension, and the spring 22 is somewhat compressed, the wires will each be pulled somewhat inwardly (away from a straight line position) at their centers. This adjustment, as we have said, may be either made when the wires are cold or when they are at any equal temperature, such as when the apparatus is operating under normal conditions. If one of the wires gets cooler than the other two, it contracts and exerts a greater pull on its connecting strap 29, pulling the target over in the direction of the cooled wire. If one of the wires becomes hotter than the others it expands, allowing the target to move in a direction away from the heated wire. The spring 22 at all times keeps the wires W and the connecting straps 29 under a suitable tension, so that the system never becomes loose and the target T is never left uncontrolled.

In the diagram of Fig. 5 we show the three line wires coming in at $L^1$, $L^2$, and $L^3$. It is on these line wires that grounds may occur and are detected by our instrument. These line wires, or leads from them, as the case may be, lead into the primaries of transformers $T^4$, $T^5$, and $T^6$, respectively. The other sides of these transformer primaries are connected by wire 25 to the station ground. These transformers $T^4$, $T^5$, and $T^6$ (not shown otherwise in the drawings) are transformers which reduce the line voltage to some standard low voltage, say 110 volts. The secondaries $S^4$, $S^5$, and $S^6$ of these three transformers are connected together in delta by wires 30, 31, and 32, 33; this last mentioned wire passing through the harmonic bell 13 and being controlled by a suitable switch 34. The primary $P^1$ of transformer $T^1$ is connected by wires 35 and 36 to wires 33 and 30 respectively, in such a manner that the primary $P^1$ is directly connected across the secondary $S^4$ alone. Similarly the primary $P^2$ of transformer $T^2$ is connected by wires 37 and 38 to the wire 36 and to another wire 39 (which leads to the wire 31) in such a manner that it bears a similar relation to the secondary $S^5$; and the primary $P^3$ of transformer $T^3$ is connected by wire 40, and the wire 39 to wire 32 and 31, respectively; so that it bears a similar relation to secondary $S^6$. The main function of the transformers $T^1$, $T^2$, and $T^3$ is to reduce the voltage which is applied to the detector; and in practice it is found convenient to reduce the voltage from the 110 volts that comes into the transformer primary to about 2 volts, which voltage is applied to the wires $W^1$, $W^2$, and $W^3$. It is one of the features of our detector that it operates on a low voltage.

Suppose now that the transmission system is in normal working order and that the flow of current through the line wires $L^1$, $L^2$, and $L^3$ is balanced. The resistance wires $W^1$, $W^2$, and $W^3$ are adjusted so that the target T will normally stand in a central position behind the mark M. With the system in balance, the same amount of current will flow through each one of the wires $W^1$, $W^2$, and $W^3$; so that the target will remain in a central position. If the voltage to ground varies similarly, the flow through the wires $W^1$, $W^2$, and $W^3$ will vary somewhat, but always similarly to each other; so that any variation in voltage in the three line wires simultaneously will be indicated in the detector by a vertical movement of the target directly toward or away from the mark M without displacing the target laterally. This, as will be seen is caused by the fact that if, for instance, the three wires $W^1$, $W^2$, and $W^3$ expand simultaneously and similarly, the strain on the connecting straps 29 will be equally released allowing the spring 22 to push the target out straight toward the mark M. The opposite action will take place if the wires $W^1$, $W^2$, and $W^3$ contract simultaneously and similarly. These connecting straps 29, by the way, can be of metal; as it will readily be seen that they connect into three independent resistance wire systems.

Suppose now, that 50-cycle current is flowing in each of the three line wires $L^1$, $L^2$, and $L^3$. Transformers $T^4$, $T^5$ and $T^6$ will now be energized and 50-cycle potential differences will exist across the secondary of each. These potential differences are at 120° in time phase from each other in a three-phase circuit, and under normal conditions are equal in magnitude. The secondaries of these transformers are connected in delta through the 50-cycle harmonic bell as can be seen in Fig. 5. Normally, therefore, there will be no 50-cycle current through the harmonic bell. Should a ground occur on any one of the three line wires, say $L^1$, the potential difference across transformer $T^4$ drops and that across $T^5$ and $T^6$ increases in proportion to the resistance of the ground. This unbalance causes 50-cycle current to flow through the secondaries of the transformers and ring the harmonic bell, calling the operator's attention to the detector.

This same unbalance causes the current through wire $W^1$ to decrease and allow it to cool, while that in wires $W^2$ and $W^3$ increases and allow them to expand. This moves the pointer in the direction of $W^1$, indicating which wire is grounded and, by the amount of its deflection, the degree of ground. If a ground should occur on two lines at once then the target would move in a direction between the two wires, representing the two wires partially grounded. Thus the instrument provides an audible signal, and a visual signal to the operator to indicate which phase is affected.

It will be seen that the sensitiveness of the instrument will depend upon several factors, among which are the distance between the pivot at 25 and the point of attachment of the connections 29, in comparison with the distance between the pivot 25 and the target T; and the amount of movement in any one connecting strap 29, which last depends on such factors as the length of the wire W, its co-efficient of expansion, its co-efficient of resistance and the amount by which it normally stands out of a straight line position, as well as the current. All these various factors are in practice chosen and adjusted so that a slight ground on one of the line wires will give a distinct indication in the instrument and a complete ground on one of the live wires will not take the instrument out of its possible range of movement.

Having described a preferred form of our invention, we claim:

1. An instrument for detecting inequalities or equality of current flow through a plurality of wires; embodying a plurality of resistance wires and mounting means therefor by which said resistance wires are held in a symmetrical arrangement about a common center; a spring supported pivot post at said center, an indicator arm pivotally universally mounted on said post, the center of such universal movement being to one side of the general plane of the resistance wires and the indicator arm extending normally to said plane; and mechanical connections between the centers of the resistance wires and the indicator arm at a point offset from its center of universal movement.

2. An instrument for detecting inequalities or equality of current flow through a plurality of wires; embodying a plurality of resistance wires and mounting means therefor by which said resistance wires are held in a symmetrical polygonal arrangement about a common center, a spring supported pivot post at said center, the end of the post being to one side of the general plane of said wires and the spring tending to move the post further away from that plane, an indicator arm universally pivotally mounted on the end of the post, and mechanical connections between the centers of the resistance wires and the arm at a point removed from the universal pivot.

In witness that we claim the foregoing we have hereunto subscribed our names this 10th day of November, 1921.

LEO P. DELSASSO.
BENJAMIN F. DENGLER.
EDWIN R. STAUFFACHER.